United States Patent
Kikuchi et al.

(10) Patent No.: US 12,223,310 B2
(45) Date of Patent: Feb. 11, 2025

(54) VEHICLE ELECTRONIC CONTROL SYSTEM, AND METHOD FOR UPDATING PROGRAM USED THEREIN

(71) Applicants: Nissan Motor Co., Ltd., Kanagawa (JP); RENAULT S.A.S., Boulogne-Billancourt (FR)

(72) Inventors: Mitsuhiko Kikuchi, Kanagawa (JP); Eisuke Ohashi, Kanagawa (JP); Hidetoshi Hayashi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 133 days.

(21) Appl. No.: 18/245,245

(22) PCT Filed: Sep. 29, 2020

(86) PCT No.: PCT/IB2020/000824
§ 371 (c)(1),
(2) Date: Mar. 14, 2023

(87) PCT Pub. No.: WO2022/069914
PCT Pub. Date: Apr. 7, 2022

(65) Prior Publication Data
US 2023/0367582 A1  Nov. 16, 2023

(51) Int. Cl.
*G06F 8/65* (2018.01)
*B60W 40/10* (2012.01)

(52) U.S. Cl.
CPC ............... *G06F 8/65* (2013.01); *B60W 40/10* (2013.01); *B60W 2510/186* (2013.01)

(58) Field of Classification Search
CPC ........................................................ G06F 8/65
See application file for complete search history.

(56) References Cited

U.S. PATENT DOCUMENTS

2004/0122537 A1* 6/2004 Kouda ................. G06F 8/654
700/90
2012/0310458 A1* 12/2012 Nawata ................. B60W 10/30
180/65.265

(Continued)

FOREIGN PATENT DOCUMENTS

JP   2010-243339 A   10/2010
JP   2014-041456 A    3/2014

(Continued)

*Primary Examiner* — Jae U Jeon
(74) *Attorney, Agent, or Firm* — Osha Bergman Watanabe & Burton LLP

(57) ABSTRACT

An electronic control system for vehicles includes an electronic control device and a master device. The master device is connected to at least two or more groups of electronic control devices each including the electronic control device and gives an instruction to the electronic control device. The electronic control device includes a storage unit including a data storage side; a second detection unit that detects a state of a vehicle; a rewrite execution unit that writes update data acquired from the master device to the data storage side to rewrite a program; an activation determination unit that determines whether or not to activate the program rewritten with the update data; and an activation execution unit that activates the program. The master device includes an update data acquisition unit that acquires the update data from an external instrument; a first detection unit that detects the state of the vehicle, the first detection unit being different from the second detection unit; a rewrite instruction unit that instructs the rewrite execution unit to write the update data to the data storage side; and an activation instruction unit that instructs the activation execution unit to activate the program when determining that the vehicle is parked using the first detection unit after the rewrite execution unit writes the update data to the data storage side according to the instruction from the rewrite instruction unit. The activation (Continued)

determination unit determines whether or not the vehicle is parked using the second detection unit when the activation execution unit activates the program according to the instruction from the activation instruction unit. The activation execution unit activates the program when the activation determination unit determines that the vehicle is parked using the second detection unit. The activation determination unit determines whether or not the vehicle is parked using an index different from that for the activation instruction unit. Each of the first detection unit and the second detection unit acquires the state of the vehicle from a group of electronic control devices selected from the at least two or more groups of electronic control devices. The group of electronic control devices from which the first detection unit acquires the state of the vehicle is different from the group of electronic control devices from which the second detection unit acquires the state of the vehicle.

13 Claims, 5 Drawing Sheets

(56) References Cited

U.S. PATENT DOCUMENTS

| | | | |
|---|---|---|---|
| 2013/0339721 A1* | 12/2013 | Yasuda | H04L 12/417 713/100 |
| 2015/0227359 A1 | 8/2015 | Todoroki et al. | |
| 2018/0201265 A1* | 7/2018 | Megyesi | B60W 10/11 |
| 2019/0332371 A1 | 10/2019 | Kobayashi | |
| 2021/0157571 A1* | 5/2021 | Ogawa | G06F 16/2379 |
| 2021/0191661 A1 | 6/2021 | Harata et al. | |

FOREIGN PATENT DOCUMENTS

| | | |
|---|---|---|
| JP | 2018-065432 A | 4/2018 |
| JP | 2018-100002 A | 6/2018 |
| WO | 2020/032122 A1 | 2/2020 |

\* cited by examiner

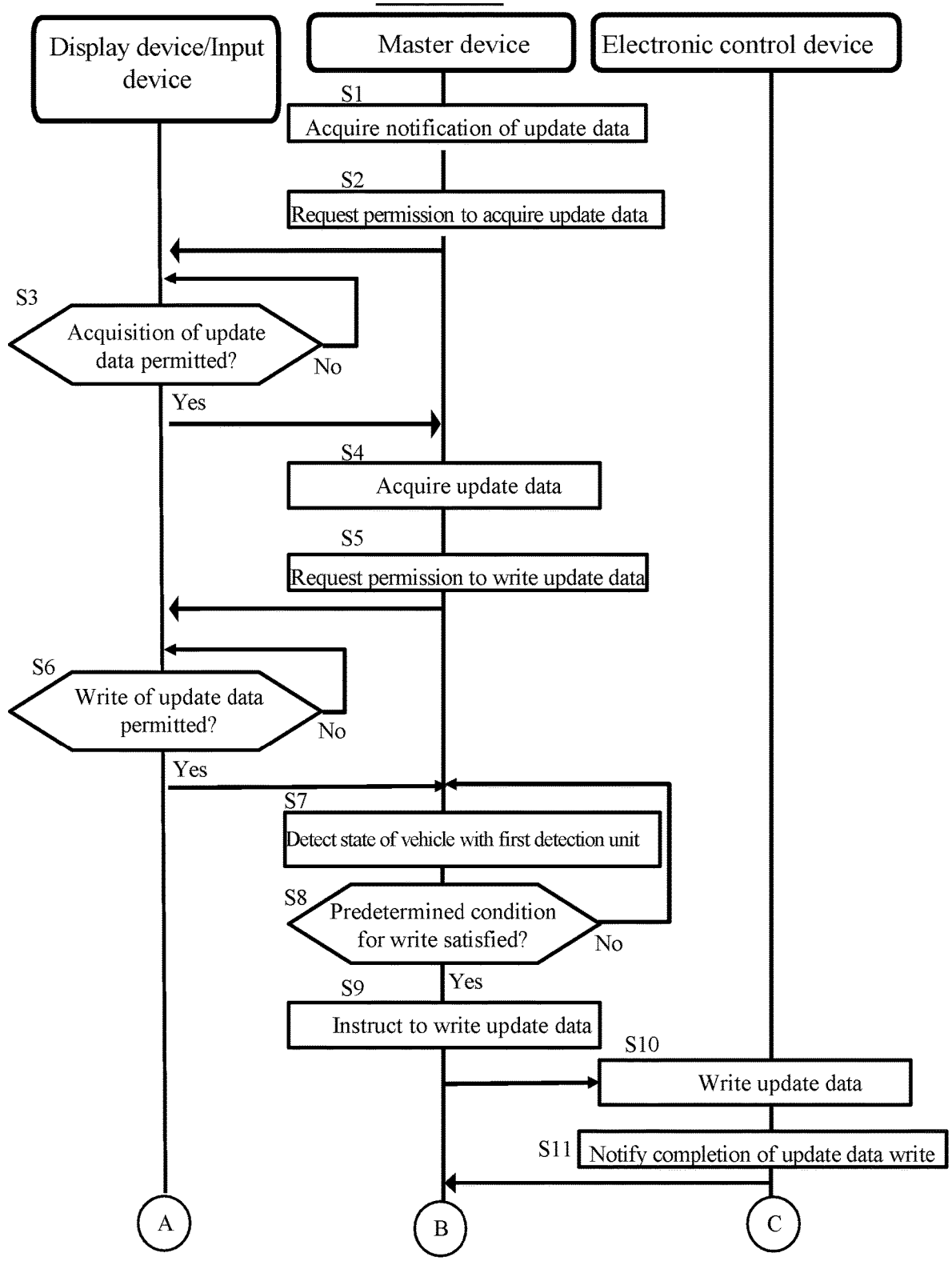

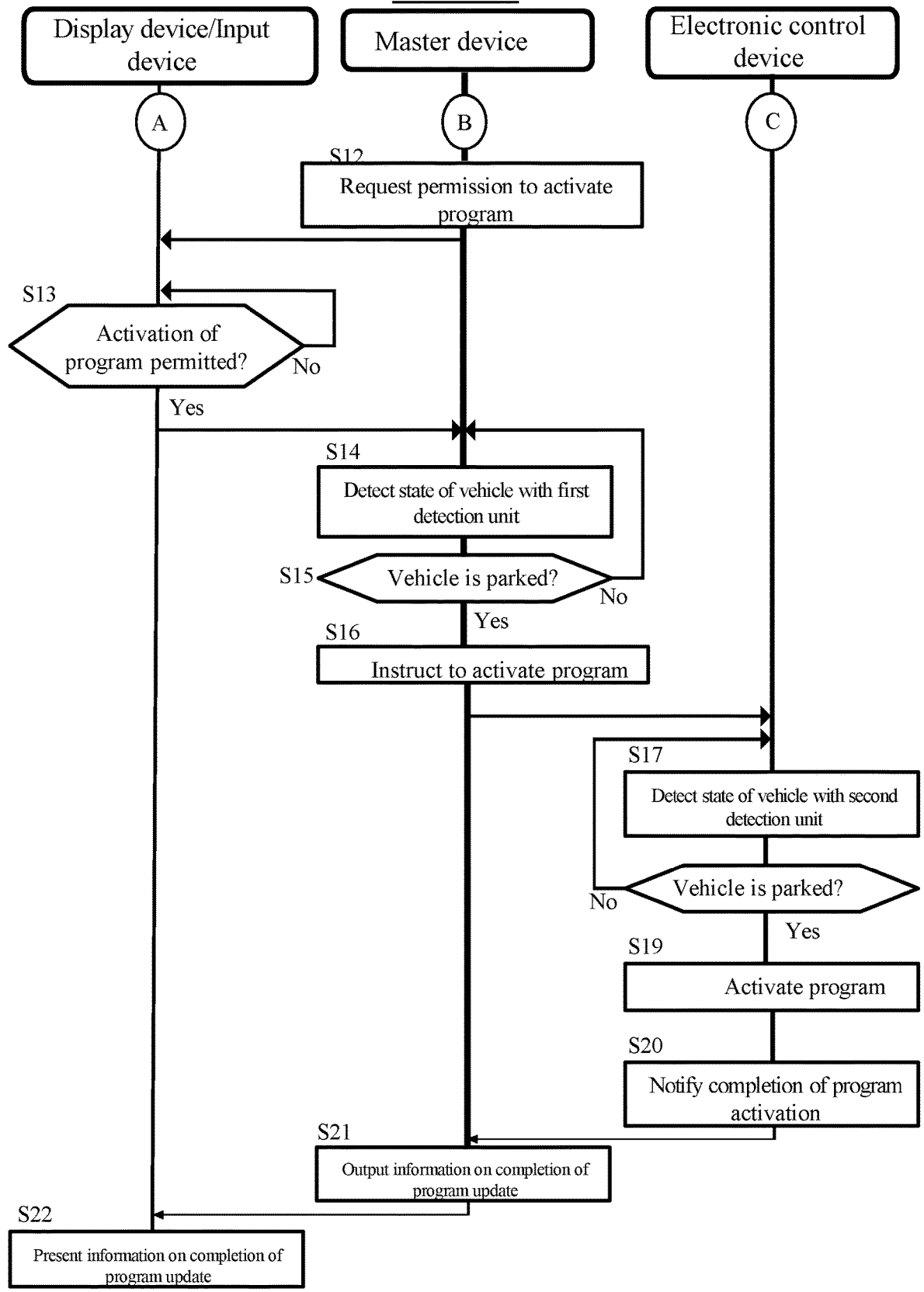

VEHICLE ELECTRONIC CONTROL SYSTEM, AND METHOD FOR UPDATING PROGRAM USED THEREIN

TECHNICAL FIELD

The present invention relates to an electronic control system for vehicles and also to a method for updating a program used in the electronic control system.

BACKGROUND ART

An electronic control device including a non-volatile memory having a first data storage side and a second data storage side is known (Patent Document 1). When an application program or parameter data stored in the first data storage side in operation is operated, update data acquired from an external device is written to the second data storage side, which is not in operation, and the second data storage side is thereby rewritten in a state in which the vehicle can travel or in a state in which the vehicle is parked. After the rewriting, in a state in which the vehicle is parked, the operation side is switched from the first data storage side to the second data storage side.

The electronic control device executes a series of processes including restart of the electronic control device according to instructions from a gateway device for vehicle, thereby switching the data storage side in operation to activate the program rewritten with the update data. The gateway device for vehicle instructs the electronic control device to activate the rewritten program when a predetermined condition is satisfied (e.g., when the state of the vehicle is a state in which the rewritten program can be activated).

PRIOR ART DOCUMENT

Patent Document

[Patent Document 1] WO2020/032122

SUMMARY OF INVENTION

Problems to be Solved by Invention

In the above prior art, however, when instructing the electronic control device to activate the rewritten program, the gateway device for vehicle may erroneously recognize that the vehicle is parked even while it is traveling, for example, due to noises upon acquisition of signals from sensors, hacking, or the like. Such erroneous recognition may cause the electronic control device to start activation of the rewritten program in a state in which the program cannot be activated under ordinary circumstances, such as in a state in which the vehicle is traveling.

A problem to be solved by the present invention is to avoid a situation in which the electronic control device starts the activation of a program despite that the program cannot be activated.

Means for Solving Problems

In the present invention, after update data acquired from an external instrument is written to a data storage side of a storage unit included in an electronic control device according to an instruction from a master device, a first detection unit is used to determine whether or not a vehicle is parked, and when a determination is made that the vehicle is parked, an instruction is given to the electronic control device to activate a program rewritten with the update data. The master device is connected to at least two or more groups of electronic control devices each comprising the electronic control device. When the program is activated according to the instruction, a second detection unit different from the first detection unit is used together with different indices for the detection units to determine whether or not the vehicle is in a parking state. Each of the first detection unit and the second detection unit acquires a state of the vehicle from a group of electronic control devices selected from the at least two or more groups of electronic control devices, and the group of electronic control devices from which the first detection unit acquires the state of the vehicle is different from the group of electronic control devices from which the second detection unit acquires the state of the vehicle. Then, when a determination is made that the vehicle is in the parking state, the rewritten program is activated. The above problem is thus solved.

Effect of Invention

According to the present invention, it is possible to avoid a situation in which the electronic control device starts the activation of a program despite that the program cannot be activated.

BRIEF DESCRIPTION OF DRAWINGS

FIG. 4A is a flowchart (part 1) illustrating an example of an information processing procedure in the electronic control system for vehicles of FIG. 1.

FIG. 4B is a flowchart (part 2) illustrating an example of the information processing procedure in the electronic control system for vehicles of FIG. 1.

MODE(S) FOR CARRYING OUT THE INVENTION

Hereinafter, one or more embodiments of the present invention will be described with reference to the drawings. The embodiments include an electronic control device, a master device, an electronic control system for vehicles that includes the electronic control device and the master device, and a method for updating a program used in the electronic control system, all of which are according to the present invention.

<Electronic Control System for Vehicles>

Figure 1:
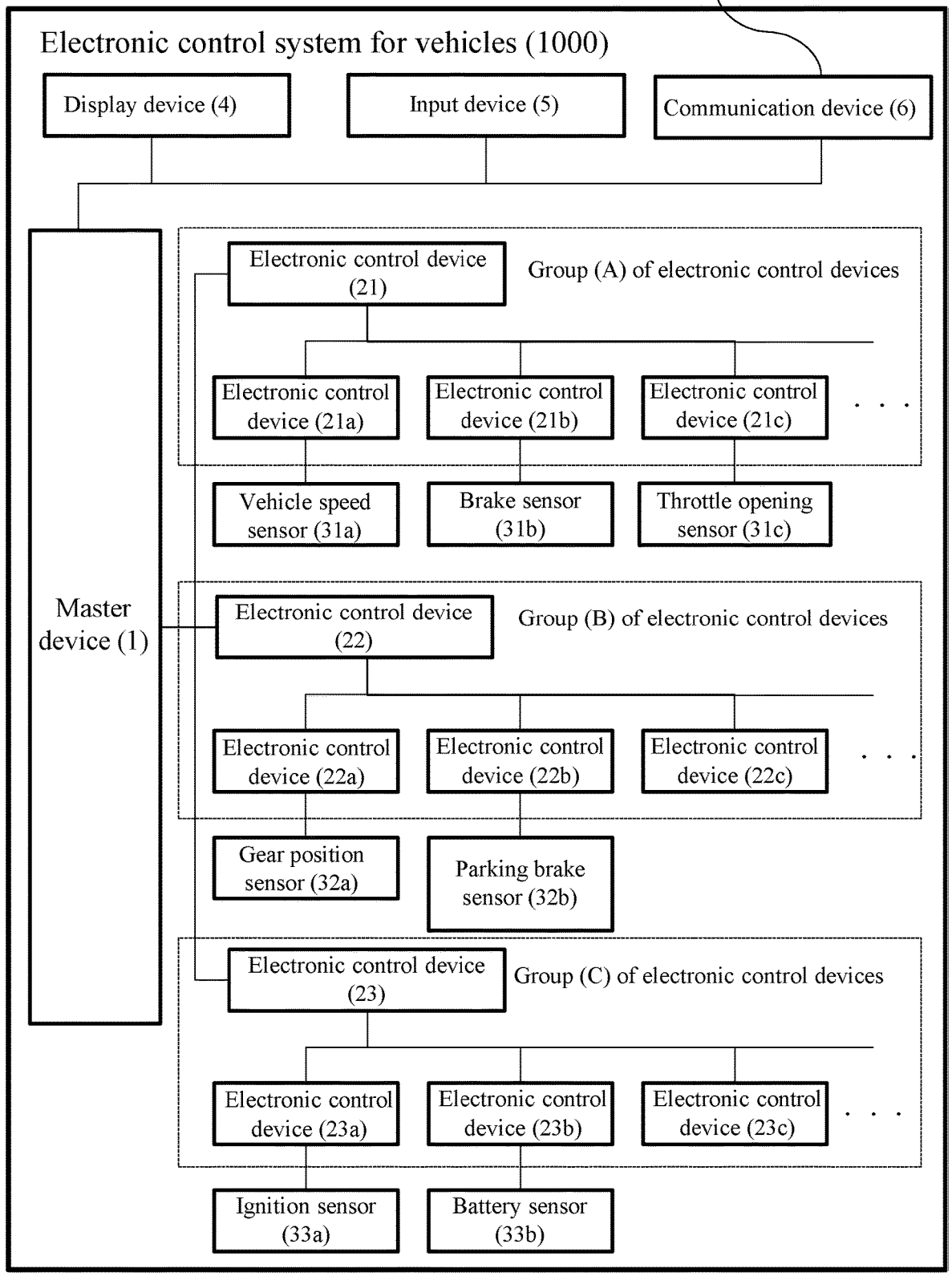
FIG. 1 is a block diagram illustrating an electronic control system for vehicles that includes electronic control devices and a master device of the present invention.

FIG. 1 is a block diagram illustrating an electronic control system for vehicles 1000 according to the present invention. The electronic control system 1000 includes a master device 1, electronic control devices 2, sensors 3, a display device 4, an input device 5, and a communication device 6. These devices included in the electronic control system 1000 are connected via a controller area network (CAN) or other onboard LAN and can exchange data with each other.

The master device 1 of the present embodiment is a device that controls the devices included in the electronic control system 1000 so that these devices cooperate with each other.

Specifically, the master device 1 gives instructions to the electronic control devices 2 to operate the electronic control devices 2 and the sensors 3. In addition, the master device 1 displays information acquired from the electronic control devices 2 and the sensors 3 on the display device 4 and acquires instructions which the driver and passengers input to the input device 5 in response to the displayed information. Further, the master device 1 connects to an external instrument 10 via the communication device 6 and acquires data from the external instrument 10 as necessary. Cooperation of these devices achieves the functions of the electronic control system 1000.

The electronic control devices 2 are devices that control various instruments installed in a vehicle. The electronic control devices 2 are usually installed as a plurality of devices in the vehicle. The electronic control devices 2 of the present embodiment constitute groups of electronic control devices composed of the plurality of electronic control devices 2. The electronic control system 1000 illustrated in FIG. 1 includes three groups A, B, and C of electronic control devices. The group A includes an electronic control device 21 and other electronic control devices 21a, 21b, 21c, etc. that are controlled by the electronic control device 21, the group B includes an electronic control device 22 and other electronic control devices 22a, 22b, 22c, etc. that are controlled by the electronic control device 22, and the group C includes an electronic control device 23 and other electronic control devices 23a, 23b, 23c, etc. that are controlled by the electronic control device 23.

The electronic control devices which constitute the group A are connected, for example, via a CAN bus and can exchange data with each other. The same applies to the groups B and C. The electronic control devices 21, 22, and 23 and the master device 1 are connected via onboard LAN such as CAN and can exchange data with each other. The number of the electronic control devices 2 and the number of the groups of electronic control devices are not particularly limited, and appropriate numbers can be set, provided that various instruments installed in the vehicle can be controlled.

The electronic control devices 2 are connected to the sensors 3 and can detect states of the vehicle, such as the traveling speed, the state of brake operation, the throttle opening, and the gear position. In the electronic control system 1000 illustrated in FIG. 1, a vehicle speed sensor 31a is connected to the electronic control device 21a, a brake sensor 31b is connected to the electronic control device 21b, a throttle opening sensor 31c is connected to the electronic control device 21c, a gear position sensor 32a is connected to the electronic control device 22a, a parking brake sensor 32b is connected to the electronic control device 22b, an ignition sensor 33a is connected to the electronic control device 23a, and a battery sensor 33b is connected to the electronic control device 23b. On the other hand, the sensors 3 are not connected to the electronic control devices 22c and 23c. Thus, not all the electronic control devices 2 need to be connected to the sensors 3. The connection between the electronic control devices 2 and the sensors 3 can be appropriately selected for each vehicle to be controlled.

Provided that the vehicle speed sensor 31a, the throttle opening sensor 31c, and the gear position sensor 32a can detect the traveling speed of the vehicle speed, the throttle opening, and the gear position (low, second, drive, neutral, parking, etc.), respectively, these sensors are not particularly limited, and known sensors can be used. Likewise, provided that the brake sensor 31b, the parking brake sensor 32b, and the ignition sensor 33a can detect whether or not the brake is operating, whether or not the parking brake is operating, and whether or not the ignition switch is turned ON, respectively, these sensors are not particularly limited, and known sensors can be used. The battery sensor 33b is also not particularly limited, provided that it can detect whether or not the battery is being charged, and a known sensor can be used.

The display device 4 is, for example, a liquid crystal display and is not particularly limited, provided that it can present the information output from the master device 1 to the driver and passengers. The input device 5 is also not particularly limited, provided that it allows the driver and passengers to input instructions to the master device 1. The display device 4 and the input device 5 need not be separate devices and may be integrated into one device (e.g., a touch screen).

The communication device 6 is not particularly limited, provided that it can communicate with other instruments via a network such as the Internet, and a known onboard communication device can be used. The communication device 6 of the present embodiment connects to the external instrument 10 so that the master device 1 can acquire necessary data. Examples of the external instrument 10 include an optical disc reader, a flash memory, and a server on a network.

<Master Device>

Figure 2:
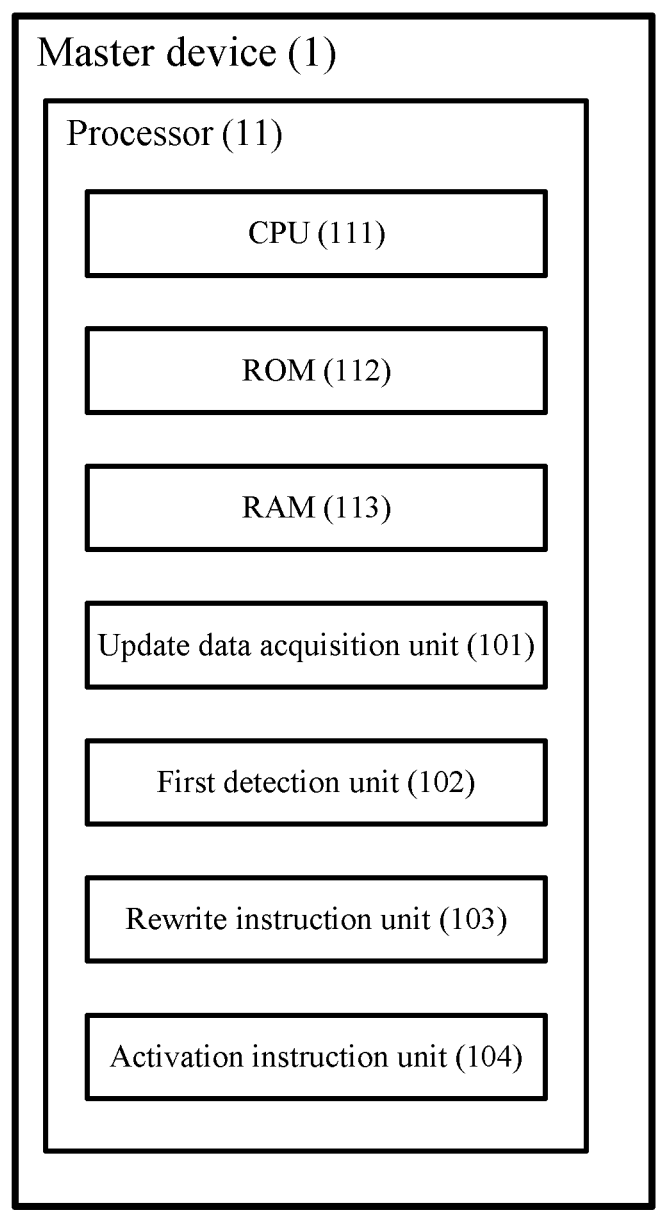
FIG. 2 is a block diagram illustrating an embodiment of the master device of FIG. 1.

FIG. 2 is a block diagram illustrating the master device 1 of the present embodiment. The master device 1 uses a processor 11 to achieve the control and cooperation of the devices included in the electronic control system 1000. The processor 11 includes a read only memory (ROM) 112 that stores one or more programs, a central processing unit (CPU) 111 that is an operation circuit for serving as the master device 1 by executing the programs stored in the ROM 112, and a random access memory (RAM) 113 that serves as an accessible storage device.

The programs used in the master device 1 of the present embodiment include an update data acquisition unit 101, a first detection unit 102, a rewrite instruction unit 103, and an activation instruction unit 104 as functional blocks for achieving the functions of the master device 1. In FIG. 2, each of these units is extracted and illustrated for convenience. These units will be described below.

The update data acquisition unit 101 of the present embodiment has a function of acquiring, from the external instrument 10, update data for rewriting the programs used in the electronic control devices 2. The update data includes not only new programs used in the electronic control devices 2, but also data for modifying any or some of programs already in operation, parameter values set in the programs, etc.

The master device 1 uses the function of the update data acquisition unit 101 to connect to the external instrument 10 at predetermined time intervals via the communication device 6 and determine whether or not the update data is available. When determining that the update data does not exist, the master device 1 disconnects the connection with the external instrument 10. On the other hand, when determining that the update data is available, the master device 1 uses the display device 4 to notify the driver and passengers that the update data is available and ask for permission to acquire the update data.

When the permission to acquire the update data is not obtained, the master device 1 disconnects the connection with the external instrument 10. On the other hand, when the permission to acquire the update data is obtained, the master device 1 uses the function of the update data acquisition unit 101 to acquire the update data from the external instrument 10 via the communication device 6. The permission to acquire the update data is not an essential condition for acquiring the update data. The master device 1 may use the function of the update data acquisition unit 101 to acquire the update data from the external instrument 10 as necessary without obtaining the permission from the driver or passenger.

The first detection unit 102 of the present embodiment has a function of detecting the state of the vehicle using a sensor 3. The state of the vehicle in the present embodiment refers, for example, to at least one of the traveling speed of the vehicle, whether or not the brake is operating, the throttle opening, the gear position, whether or not the parking brake is operating, whether or not the ignition switch is turned ON, and whether or not the battery is being charged. The master device 1 can use the function of the first detection unit 102 to acquire the state of the vehicle from a group of electronic control devices selected from the plurality of groups of electronic control devices. Alternatively, the master device 1 may use the function of the first detection unit 102 to acquire the state of the vehicle from the plurality of groups of electronic control devices.

The rewrite instruction unit 103 of the present embodiment has a function of instructing a rewrite execution unit 203 of an electronic control device 2, which is the target of program update, to write the update data to a data storage side to rewrite the program. After using the function of the update data acquisition unit 101 to acquire the update data from the external instrument 10, the master device 1 uses the function of the rewrite instruction unit 103 together with the display device 4 to ask the driver and passengers for permission to acquire the update data. When the permission to acquire the update data is not obtained, the master device 1 terminates, for example, the program update process. On the other hand, when the permission to acquire the update data is obtained, the master device 1 uses the function of the rewrite instruction unit 103 to determine whether or not a predetermined condition for writing the update data to the electronic control device 2 is satisfied.

Examples of the predetermined condition include conditions such as the vehicle traveling, the vehicle being temporarily stopped, and the vehicle being parked. A determination of whether or not the predetermined condition is satisfied may be performed, for example, as follows. First, the master device 1 uses the function of the first detection unit 102 together with the parking brake sensor 32b to detect whether or not the parking brake is operating. Then, when it is detected that the parking brake is operating, the master device 1 determines that the vehicle is being parked and the predetermined condition is satisfied.

When determining that the predetermined condition for writing the update data to the electronic control device 2 is not satisfied, the master device 1 determines again whether or not the predetermined condition is satisfied, for example, at a predetermined time interval. On the other hand, when determining that the predetermined condition for writing the update data to the electronic control device 2 is satisfied, the master device 1 instructs the electronic control device 2 to write the update data to the data storage side. Permission for issuing an instruction to the electronic control device 2 to write the update data to the data storage side is not necessarily required. The master device 1 may use the function of the rewrite instruction unit 103 to issue an instruction to the electronic control device 2 to write the update data to the data storage side as necessary without obtaining the permission from the driver or passenger.

The activation instruction unit 104 of the present embodiment has a function of determining whether or not the vehicle is parked, using the first detection unit 102 after the rewrite execution unit 203 writes the update data to the data storage side according to the instruction from the rewrite instruction unit 103. When acquiring a notification that the update data has been written from the electronic control device 2 which is the target of program update, the master device 1 uses the function of the activation instruction unit 104 together with the display device 4 to ask the driver and passengers for permission to activate the program rewritten with the update data. When the permission to activate the program is not obtained, the master device 1 asks for the permission again, for example, at a predetermined time interval. Alternatively, the master device 1 may terminate the program update process. On the other hand, when the permission to activate the program is obtained, the master device 1 uses the function of the activation instruction unit 104 together with the first detection unit 102 to determine whether or not the vehicle is parked.

When using the first detection unit 102 to determine that the vehicle is not parked, the master device 1 uses the first detection unit 102 again at a predetermined time interval to determine whether or not the vehicle is parked. Alternatively, the master device 1 may terminate the program update process. On the other hand, when using the first detection unit 102 to determine that the vehicle is parked, the master device 1 uses the function of the activation instruction unit 104 to instruct an activation execution unit 205 of the electronic control device 2 to activate the program rewritten with the update data. When determining whether or not the vehicle is parked, the master device 1 acquires the state of the vehicle from a sensor 3 using the first detection unit 102. Then, the master device 1 determines, based on the obtained vehicle state, whether or not the vehicle is parked.

For example, the master device 1 acquires the traveling speed of the vehicle from the vehicle speed sensor 31a and determines that the vehicle is parked when the vehicle speed is 0 km/h. Alternatively or in addition to this, the master device 1 acquires information from the brake sensor 31b as to whether or not the brake is operating, and determines that the vehicle is parked when the brake is operating. Alternatively or in addition to this, the master device 1 acquires the throttle opening from the throttle opening sensor 31c and determines that the vehicle is parked when the opening is zero. Alternatively or in addition to this, the master device 1 acquires gear position information from the gear position sensor 32a and determines that the vehicle is parked when the gear position is the parking brake position. Alternatively or in addition to this, the master device 1 acquires information from the parking brake sensor 32b as to whether or not the parking brake is operating, and determines that the vehicle is parked when the parking brake is operating. Alternatively or in addition to this, the master device 1 acquires information from the ignition sensor 33a as to whether or not the ignition switch is turned ON, and determines that the vehicle is parked when the ignition switch is turned OFF.

<Electronic Control Device>

Figure 3:
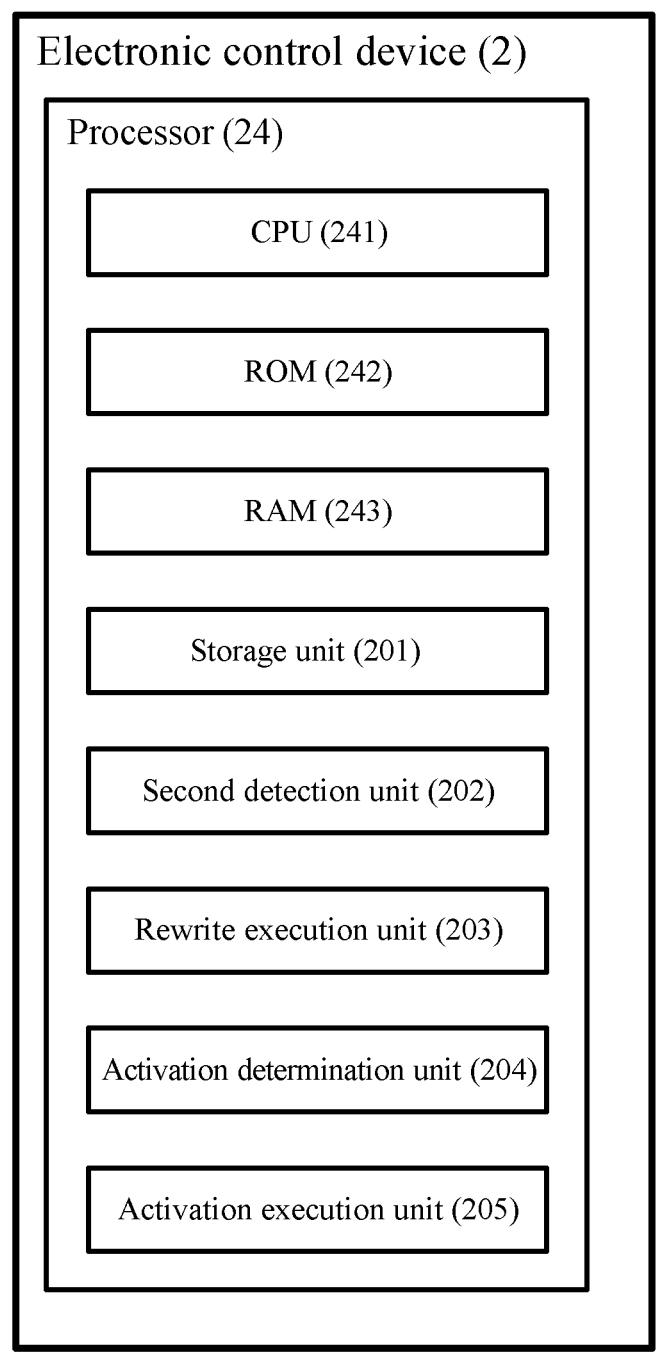
FIG. 3 is a block diagram illustrating an embodiment of an electronic control device of FIG. 1.

FIG. 3 is a block diagram illustrating an electronic control device 2 of the present embodiment. The electronic control device 2 uses a processor 24 to achieve control of various instruments installed in the vehicle. Like the processor 11, the processor 24 includes a ROM 242 that stores one or more programs, a CPU 241 that is an operation circuit for serving as the electronic control device 2 by executing the programs stored in the ROM 242, and a RAM 243 that serves as an accessible storage device.

The electronic control device 2 of the present embodiment includes a storage unit 201 including one or more data storage sides for writing and storing data particularly by an electromagnetic method. The storage unit of the present embodiment may be a non-volatile memory having at least a first data storage side and a second data storage side.

The programs used in the electronic control device 2 of the present embodiment include a second detection unit 202, a rewrite execution unit 203, an activation determination unit 204, and an activation execution unit 205 as functional blocks for achieving the functions of the electronic control device 2. In FIG. 3, each of these units is extracted and illustrated for convenience. These units will be described below.

Like the first detection unit 102, the second detection unit 202 of the present embodiment has a function of detecting the state of the vehicle using a sensor 3. In the electronic control system 1000 according to the present invention, the first detection unit 102 of the master device 1 and the second detection unit 202 of the electronic control device 2 have the same functions of acquiring the state of the vehicle from respective sensors 3, but are different detection units, and each operates independently.

In particular, the second detection unit of the present embodiment has a function of acquiring signals from a CAN bus that connects the electronic control devices 2 in one or more groups of electronic control devices. The CAN bus connects only to onboard devices and does not connect to external instruments, so the signals on the CAN bus are less susceptible to hacking. It is therefore possible to further avoid erroneous recognition in the electronic control devices 2. Each of the electronic control devices 2 may use the function of the second detection unit 202 to acquire the state of the vehicle from a group of electronic control devices selected from a plurality of groups of electronic control devices or alternatively acquire the state of the vehicle from the plurality of groups of electronic control devices.

When the master device 1 uses the function of the first detection unit 102 to acquire the state of the vehicle from a group of electronic control devices selected from the plurality of groups of electronic control devices while an electronic control device 2 uses the second detection unit 202 to acquire the state of the vehicle from a group of electronic control devices selected from the plurality of groups of electronic control devices, the group of electronic control devices from which the first detection unit 102 acquires the state of the vehicle may be different from the group of electronic control devices from which the second detection unit 202 acquires the state of the vehicle. For example, in the case of updating the program of the electronic control device 23*c*, when the master device 1 uses the first detection unit 102 to acquire the vehicle speed detected by the vehicle speed sensor 31*a* from the electronic control device 21*a* of the group A of FIG. 1 in order to determine whether or not the vehicle is parked, the electronic control device 23*c* uses the second detection unit 202 to acquire the operating state of the parking brake detected by the parking brake sensor 32*b* from the electronic control device 22*b* of the group B. Determination of the parking state of the vehicle in an electronic control device 2 will be described later.

The rewrite execution unit 203 of the present embodiment has a function of writing the update data acquired from the master device 1 to the data storage side to rewrite the program. The method for an electronic control device 2 to write the update data to the data storage side is not particularly limited, and a known data writing method can be used. When the storage unit 201 has two or more data storage sides including the first data storage side and the second data storage side, the rewrite execution unit 203 of the present embodiment may write the update data acquired from the master device 1 to the second data storage side in a state in which the program stored in the first data storage side is operating. This allows the program rewrite to be completed while the electronic control device 2 is operating. The rewrite execution unit 203 may notify the master device 1 of the completion of the program rewrite after the program rewrite is completed.

The activation determination unit 204 has a function of determining whether or not to activate the program rewritten with the update data. In particular, the activation determination unit 204 of the present embodiment uses the second detection unit 202 to determine whether or not the vehicle is parked when the activation execution unit 205 activates the program, which has been rewritten with the update data, according to the instruction from the activation instruction unit 104. Regarding this determination, the specific determination method using the vehicle speed, parking brake state, ignition switch state, gear position, throttle opening, etc. is the same as that described for the activation instruction unit 104.

When determining that the vehicle is not parked, the activation determination unit 204 determines again at a predetermined time interval whether or not the vehicle is parked. On the other hand, when determining that the vehicle is parked, the activation determination unit 204 allows the activation execution unit 205 to activate the program rewritten with the update data. The activation determination unit 204 of the present embodiment may also allow the activation execution unit 205 to activate the program in operation. For example, upon the activation of a program responsible for the lane keeping function of autonomous travel assist, even in its operation, the program is in a standby state while the vehicle is parked, and it is not necessary to start the process immediately. The activation determination unit 204 therefore allows the activation execution unit 205 to activate the program for lane keeping in operation.

The timing at which an electronic control device 2 uses the function of the activation determination unit 204 together with the second detection unit 202 to determine whether or not the vehicle is parked may be when the electronic control device 2 acquires an instruction to activate the program from the activation instruction unit 104, that is, at the same time as when acquiring the instruction. This can encourage the driver and passengers to update an urgent program immediately. When using the function of the activation determination unit 204 to determine whether or not the vehicle is parked, the electronic control device 2 may use an index different from that used by the activation instruction unit 104 of the master device 1 at the time of determining whether or not the vehicle is parked. When different functional blocks independently determine the parking state of the vehicle using different indices, erroneous recognition of the parking state can be further avoided.

As an example, when using the function of the activation instruction unit 104 to determine whether or not the vehicle is parked, the master device 1 uses the first detection unit 102 to detect a device state of any one of the parking brake, the ignition, the vehicle speed, and the gear position. Then, when using the function of the activation determination unit 204 to determine whether or not the vehicle is parked, the electronic control device 2 uses the function of the second detection unit 202 to detect a device state of any one of the parking brake, the ignition, the vehicle speed, and the gear position, but the device state detected by the electronic control devices 2 is different from the device state which the master device 1 detects using the function of the first detection unit 102.

Even in a case of determining that the vehicle is parked, when a predetermined activation avoidance condition is satisfied, the activation determination unit 204 of the present embodiment can avoid the activation of the rewritten program by the activation execution unit 205. For example, when a high-voltage power source is used, such as when the battery of an electric vehicle is being charged, if the program is activated during the charging, a load will be applied to a relay to damage it upon restart of the electronic control device 2 due to the activation of the program. In an electric vehicle, therefore, even when the vehicle is parked, but when the battery is being charged, the activation determination unit 204 avoids the activation of the program by the activation execution unit 205. Whether or not the battery is being charged can be determined by using the battery sensor 33b to detect whether or not the battery is being charged, in particular, whether or not the high-voltage relay is turned OFF. When the high-voltage relay is turned OFF, the battery is not being charged, while when the high-voltage relay is turned ON, the battery is being charged.

The activation execution unit 205 has a function of activating the program rewritten with the update data. In particular, the activation execution unit 205 of the present embodiment has a function of activating the program rewritten with the update data when the activation determination unit 204 determines that the vehicle is parked, using the second detection unit 202. When the program is activated, the power of the electronic control device 2, which is the target of program update, is turned off once and then turned on. That is, the electronic control device 2 is restarted.

When activating the program, the activation execution unit 205 of the present embodiment may control the vehicle so that it maintains its parking state from the start to the completion of activation of the program. For example, the master device 1 is notified that the activation of the program has been started, and is caused to invalidate a signal for the vehicle to start traveling (e.g., a signal for increasing the opening of the throttle). This allows the program update to be completed while maintaining the parking state of the vehicle.

Provided that the storage unit 201 has two or more data storage sides including the first data storage side and the second data storage side, when activating the program which is rewritten with the update data and stored in the second data storage side, the activation execution unit 205 of the present embodiment may operate the rewritten program stored in the second data storage side and stop the operation of the program stored in the first data storage side. This can avoid a situation in which the program before the rewrite and the program after the rewrite operate at the same time.

After the activation of the program is completed, the activation execution unit 205 may notify the master device 1 that the activation of the program has been completed. In this case, after acquiring from the electronic control device 2 the notification that the activation of the program has been completed, the master device 1 may present on the display device 4 the information indicating that the update of the program has been completed in order to notify the occupants of this fact.

<Processing of Electronic Control System for Vehicles>

With reference to FIGS. 4A and 4B, the processing when the electronic control system 1000 of the present embodiment rewrites a program with update data and activates the rewritten program will be described. FIGS. 4A and 4B illustrate an example of a flowchart representing the information processing in the master device 1, an electronic control device 2, the display device 4, and the input device 5.

In the flowchart illustrated in FIGS. 4A and 4B, the routine on the left represents the steps executed in the display device 4 and the input device 5, the routine in the middle represents the steps executed in the master device 1, and the routine on the right represents the steps executed in an electronic control device 2. The processing described below is executed at predetermined time intervals in each device.

First, in step S1 of FIG. 4A, the master device 1 uses the function of the update data acquisition unit 101 to acquire a notification that update data is available, from the external instrument 10 via the communication device 6. In subsequent step S2, the master device 1 asks the occupants (including the driver and passengers, here and hereinafter) for permission to acquire the update data. The master device 1 uses the function of the update data acquisition unit 101 to display information for asking for the permission on the display device 4.

In step S3, an occupant uses the input device 5 to instruct the master device 1 whether or not to acquire the update data. When the occupant instructs not to acquire the update data (step S3: No), the master device 1 asks again for permission to acquire the update data at a predetermined time interval. When the number of times of asking for permission exceeds a predetermined number, the master device 1 may stop the routine illustrated in the flowchart and terminate the program update process. On the other hand, when the occupant instructs to acquire the update data (step S3: Yes), a determination is made that the permission to acquire the update data is obtained, and the process proceeds to step S4. Steps S2 and S3 are not essential steps for the program update process according to the present invention and may be provided as necessary.

In step S4, the master device 1 uses the function of the update data acquisition unit 101 to acquire the update data from the external instrument 10 via the communication device 6. After acquiring the update data, in subsequent step S5, the master device 1 asks the occupants for permission to write the update data to the data storage side of an electronic control device 2 which is the target of program update. The master device 1 uses the function of the rewrite instruction unit 103 to display information for asking for the permission on the display device 4.

In step S6, an occupant uses the input device 5 to notify the master device 1 of whether or not to write the update data to the data storage side to rewrite the program. When the occupant instructs not to write the update data to the data storage side (step S6: No), the master device 1 asks the occupant for the permission again at a predetermined time interval. When the number of times of asking for the permission exceeds a predetermined number, the master device 1 may stop the routine illustrated in the flowchart and terminate the program update process. On the other hand, when the occupant instructs to write the update data to the data storage side to rewrite the program (step S6: Yes), a determination is made that the permission to rewrite the program is obtained, and the process proceeds to step S7.

Steps S5 and S6 are not essential steps for the program update process according to the present invention and may be provided as necessary.

In step S7, the master device 1 uses the function of the rewrite instruction unit 103 together with the first detection unit 102 to detect the state of the vehicle from a sensor 3. In subsequent step S8, from the state of the vehicle acquired in step S7, the master device 1 determines whether or not the state of the vehicle satisfies a predetermined condition for writing the update data to the electronic control device 2. When determining that the vehicle state does not satisfy the predetermined condition (step S8: No), the master device 1 determines again at a predetermined time interval whether or not the state of the vehicle satisfies the predetermined condition. On the other hand, when determining that the state of the vehicle satisfies the predetermined condition (step S8: Yes), the process proceeds to step S9.

In step S9, the master device 1 uses the function of the rewrite instruction unit 103 to instruct the electronic control device 2, which is the target of program update, to write the update data. In step S10, the electronic control devices 2 which has acquired the instruction uses the function of the rewrite execution unit 203 to write the update data to the data storage side to rewrite the program. When the rewrite of the program is completed, in subsequent step S11, the electronic control device 2 uses the function of the rewrite execution unit 203 to notify the master device 1 that the rewrite of the program has been completed.

Proceeding to step S12 of FIG. 4B, the master device 1 which has acquired the notification of completion of the update data write asks the occupants for permission to activate the program rewritten with the update data. The master device 1 uses the function of the activation instruction unit 104 to display information for asking for permission to activate the program on the display device 4.

In step S13, an occupant uses the input device 5 to instruct the master device 1 whether or not to activate the program. When the occupant instructs not to activate the program (step S13: No), the master device 1 asks again at a predetermined time interval for the permission to activate the program. When the number of times of asking for the permission exceeds a predetermined number, the master device 1 may stop the routine illustrated in the flowchart and terminate the program update process. On the other hand, when the occupant instructs to activate the rewritten program (step S13: Yes), a determination is made that the permission to activate the program is obtained, and the process proceeds to step S14.

In step S14, the master device 1 uses the function of the activation instruction unit 104 together with the first detection unit 102 to detect the state of the vehicle from a sensor 3. In subsequent step S15, the master device 1 determines whether or not the state of the vehicle is the parking state from the state of the vehicle acquired in step S14. When determining that the vehicle is not parked (step S15: No), the master device 1 determines again at a predetermined time interval whether or not the vehicle is parked. On the other hand, when the master device 1 determines that the vehicle is parked (step S15: Yes), the process proceeds to step S16.

In step S16, the master device 1 uses the function of the activation instruction unit 104 to instruct the electronic control device 2, which is the target of program update, to activate the rewritten program. The electronic control device 2 which has received the instruction uses the second detection unit 202 in step S17 to detect the state of the vehicle from a sensor 3. This detection is based on the function of the activation determination unit 204. In subsequent step S18, the electronic control device 2 determines whether or not the state of the vehicle is the parking state from the state of the vehicle acquired in step S17. When determining that the vehicle is not parked (step S18: No), the electronic control device 2 determines again at a predetermined time interval whether or not the vehicle is parked. On the other hand, when the electronic control device 2 determines that the vehicle is parked (step S18: Yes), the process proceeds to step S19.

In step S19, the electronic control device 2 uses the function of the activation execution unit 205 to activate the rewritten program. When the activation of the program is completed, the electronic control device 2 uses the function of the activation execution unit 205 in subsequent step S20 to notify the master device 1 that the activation of the program has been completed. In step S21, the master device 1 which has acquired the notification of completion of the program activation outputs to the display device 4 the information that the update of the program has been completed. Then, in step S22, the display device 4 presents the occupants with the information that the update of the program has been completed.

EMBODIMENTS OF PRESENT INVENTION

As described above, the electronic control system 1000 of the present embodiment comprises an electronic control device 2 and a master device 1 that gives an instruction to the electronic control device 2. The electronic control device 2 comprises: a storage unit 201 including a data storage side: a second detection unit 202 that detects a state of a vehicle: a rewrite execution unit 203 that writes update data acquired from the master device 1 to the data storage side to rewrite a program: an activation determination unit 204 that determines whether or not to activate the program rewritten with the update data; and an activation execution unit 205 that activates the program. The master device 1 comprises: an update data acquisition unit 101 that acquires the update data from an external instrument 10: a first detection unit 102 that detects the state of the vehicle, the first detection unit 102 being different from the second detection unit 202; a rewrite instruction unit 103 that instructs the rewrite execution unit 203 to write the update data to the data storage side; and an activation instruction unit 104 that instructs the activation execution unit 205 to activate the program when determining that the vehicle is parked using the first detection unit 102 after the rewrite execution unit 203 writes the update data to the data storage side according to the instruction from the rewrite instruction unit 103. The activation determination unit 204 determines whether or not the vehicle is parked using the second detection unit 202 when the activation execution unit 205 activates the program according to the instruction from the activation instruction unit 104. The activation execution unit 205 activates the program when the activation determination unit 204 determines that the vehicle is parked using the second detection unit 202. This allows the different detection units 102 and 202 to be used to separately determine whether or not the vehicle is parked. As a result, it is possible to avoid a situation in which the electronic control device 2 starts the activation of a program despite that the program cannot be activated, for example, while the vehicle is traveling.

Moreover, according to the electronic control system 1000 of the present embodiment, the activation determination unit 204 acquires the instruction to activate the program from the activation instruction unit 104 and determines whether or not the vehicle is parked using the second detection unit 202. This can encourage the driver and passengers to update an urgent program immediately.

Further, according to the electronic control system 1000 of the present embodiment, the activation determination unit 204 determines whether or not the vehicle is parked using an index different from that for the activation instruction unit 104. By determining the parking state of the vehicle using two or more different indices, it is possible to avoid erroneous recognition even when the use of only one of the indices may cause erroneous recognition of the parking state.

Furthermore, according to the electronic control system 1000 of the present embodiment, when the activation instruction unit 104 determines whether or not the vehicle is parked, the first detection unit 102 detects a device state of any one of a parking brake, an ignition switch, a vehicle speed, and a gear position. When the activation determination unit 204 determines whether or not the vehicle is parked, the second detection unit 202 detects a device state of any one of the parking brake, the ignition switch, the vehicle speed, and the gear position. The device state detected by the first detection unit 102 is different from the device state detected by the second detection unit 202. This allows different functional blocks to independently determine the parking state of the vehicle using different indices, and as a result, erroneous recognition of the parking state can be further avoided.

In addition, according to the electronic control system 1000 of the present embodiment, the master device 1 is connected to a plurality of groups of electronic control devices, each group comprising a plurality of electronic control devices. Each of the first detection unit 102 and the second detection unit 202 acquires the state of the vehicle from a group of electronic control devices selected from the plurality of groups of electronic control devices. The group of electronic control devices from which the first detection unit 102 acquires the state of the vehicle is different from the group of electronic control devices from which the second detection unit 202 acquires the state of the vehicle. With this configuration, even if the group of electronic control devices from which the first detection unit 102 acquires data is affected by noise or hacking, erroneous recognition of the state of the vehicle can be avoided, provided that the group of electronic control devices from which the second detection unit 202 acquires data is robust.

Moreover, according to the electronic control system 1000 of the present embodiment, the second detection unit 202 acquires a signal from a CAN bus. The signals on the CAN bus, which does not connect to external instruments, are less susceptible to hacking, and it is therefore possible to further avoid erroneous recognition in the electronic control device 2.

Further, according to the electronic control system 1000 of the present embodiment, when the activation execution unit 205 activates the program, the vehicle is controlled so as to maintain a parking state of the vehicle from start to completion of activation of the program. This allows the program update process to be completed while maintaining the parking state of the vehicle.

Furthermore, according to the electronic control system 1000 of the present embodiment, the storage unit 201 is a nonvolatile memory having at least a first data storage side and a second data storage side. This allows the update data to be written to one data storage side while operating the program on the other data storage side.

In addition, according to the electronic control system 1000 of the present embodiment, the rewrite execution unit 203 writes the update data acquired from the master device 1 to the second data storage side in a state in which the program stored in the first data storage side is operating. This allows the program in the second data storage side to be rewritten while the electronic control device 2 is in operation, in particular, while the program in the first data storage side is operating.

Moreover, according to the electronic control system for vehicles of the present embodiment, when activating the program stored in the second data storage side and rewritten with the update data, the activation execution unit 205 operates the rewritten program stored in the second data storage side and stops operation of the program stored in the first data storage side. This can avoid a situation in which the program before the rewrite and the program after the rewrite operate at the same time.

The electronic control device 2 of the present embodiment comprises: a storage unit 201 including a data storage side: a second detection unit 202 that detects a state of a vehicle: a rewrite execution unit 203 that acquires update data from a master device 1 and writes the update data to the data storage side to rewrite a program, the master device 1 acquiring the update data from an external instrument 10; an activation determination unit 204 that determines whether or not to activate the program rewritten with the update data; and an activation execution unit 205 that activates the program. The rewrite execution unit 203 writes the update data to the data storage side according to an instruction from a rewrite instruction unit 103 of the master device 1. The instruction instructs the rewrite execution unit 203 to write the update data to the data storage side. The activation execution unit 205 activates the program according to an instruction from an activation instruction unit 104 of the master unit 1. The instruction instructs the activation execution unit 205 to activate the program when the master device 1 determines that the vehicle is parked using a first detection unit 102 after the rewrite execution unit 203 writes the update data to the data storage side according to the instruction from the rewrite instruction unit 103. The first detection unit 102 detects the state of the vehicle. The first detection unit 102 is different from the second detection unit 202. The activation determination unit 204 determines whether or not the vehicle is parked using the second detection unit 202 when the activation execution unit 205 activates the program according to the instruction from the activation instruction unit 104. The activation execution unit 205 activates the program when the activation determination unit 204 determines that the vehicle is parked using the second detection unit 202. This allows the different detection units 102 and 202 to be used to separately determine whether or not the vehicle is parked. As a result, it is possible to avoid a situation in which the electronic control device 2 starts the activation of a program despite that the program cannot be activated, for example, while the vehicle is traveling.

The master device 1 of the present embodiment gives an instruction to an electronic control device 2 having a storage unit 201 including a data storage side. The master device 1 comprises: an update data acquisition unit 101 that acquires update data from an external instrument 10; a first detection unit 102 that detects a state of a vehicle, the first detection unit 102 being different from a second detection unit 202 that is included in the electronic control device 2 and detects the state of the vehicle: a rewrite instruction unit 103 that instructs a rewrite execution unit 203 of the electronic control device 2 to write the update data to the data storage side to rewrite a program, the rewrite execution unit 203 writing the update data acquired from the master device 1 to the data storage side to rewrite the program; and an activation instruction unit 104 that instructs an activation execution unit 205 of the electronic control device 2 to activate the program when determining that the vehicle is parked using the first detection unit 102 after the rewrite execution unit 203 writes the update data to the data storage side according to the instruction from the rewrite instruction unit 103, the activation execution unit 205 activating the program rewritten with the update data. The electronic control device 2 includes an activation determination unit 204 that determines whether or not to activate the program. The activation determination unit 204 determines whether or not the vehicle is parked using the second detection unit 202 when the activation execution unit 205 activates the program according to the instruction from the activation instruction unit 104. The activation execution unit 205 activates the program when the activation determination unit 204 determines that the vehicle is parked using the second detection unit 202. This allows the different detection units 102 and 202 to be used to separately determine whether or not the vehicle is parked. As a result, it is possible to avoid a situation in which the electronic control device 2 starts the activation of a program despite that the program cannot be activated, for example, while the vehicle is traveling.

The method for updating a program of the present embodiment comprises: acquiring update data from an external instrument 11 to a master device 1: writing the update data acquired to the master device 1 to a data storage side of a storage unit 201 included in an electronic control device 2 according to an instruction from the master device 1: determining whether or not the vehicle is parked using a first detection unit 102 after writing the update data to the data storage side: when determining that the vehicle is parked using the first detection unit 102, giving an instruction to the electronic control device 2 to activate a program stored in the data store side and rewritten with the update data: when activating the program according to the instruction to activate the program, determining whether or not the vehicle is in a parking state using a second detection unit 202 different from the first detection unit 102; and when determining that the vehicle is in the parking state using the second detection unit 202, activating the program. This allows the different detection units 102 and 202 to be used to separately determine whether or not the vehicle is parked. As a result, it is possible to avoid a situation in which the electronic control device 2 starts the activation of a program despite that the program cannot be activated, for example, while the vehicle is traveling.

DESCRIPTION OF REFERENCE NUMERALS

1000 . . . Electronic control system for vehicles
  1 . . . Master device
    11 . . . Processor
      111 . . . CPU
      112 . . . ROM
      113 . . . RAM
    101 . . . Update data acquisition unit
    102 . . . First detection unit
    103 . . . Rewrite instruction unit
    104 . . . Activation instruction unit
  2 . . . Electronic control devices
    A . . . Group of electronic control devices
      21, 21a, 21b, 21c . . . Electronic control device (Group A of electronic control devices)
    B . . . Group of electronic control devices
      22, 22a, 22b, 22c . . . Electronic control device (Group B of electronic control devices)
    C . . . Group of electronic control devices
      23, 23a, 23b, 23c . . . Electronic control device (Group C of electronic control devices)
    24 . . . Processor
      241 . . . CPU
      242 . . . ROM
      243 . . . RAM
    201 . . . Storage unit
    202 . . . Second detection unit
    203 . . . Rewrite execution unit
    204 . . . Activation determination unit
    205 . . . Activation execution unit
  3 . . . Sensors
    31a . . . Vehicle speed sensor
    31b . . . Brake sensor
    31c . . . Throttle opening sensor
    32a . . . Gear position sensor
    32b . . . Parking brake sensor
    33a . . . Ignition sensor
    33b . . . Battery sensor
  4 . . . Display device
  5 . . . Input device
  6 . . . Communication device
  10 . . . External instrument

The invention claimed is:

1. An electronic control system for vehicles, comprising an electronic control device and a master device that is connected to at least two or more groups of electronic control devices each comprising the electronic control device and gives an instruction to the electronic control device, the electronic control device comprising:
  a storage unit including a data storage side;
  a second detection unit that detects a state of a vehicle;
  a rewrite execution unit that writes update data acquired from the master device to the data storage side to rewrite a program;
  an activation determination unit that determines whether or not to activate the program rewritten with the update data; and
  an activation execution unit that activates the program, the master device comprising:
  an update data acquisition unit that acquires the update data from an external instrument;
  a first detection unit that detects the state of the vehicle, the first detection unit being different from the second detection unit;
  a rewrite instruction unit that instructs the rewrite execution unit to write the update data to the data storage side; and
  an activation instruction unit that instructs the activation execution unit to activate the program when determining that the vehicle is parked using the first detection unit after the rewrite execution unit writes the update data to the data storage side according to the instruction from the rewrite instruction unit, the activation determination unit determining whether or not the vehicle is parked using the second detection unit when the activation execution unit activates the program according to the instruction from the activation instruction unit, the activation execution unit activating the program when the activation determination unit determines that the vehicle is parked using the second detection unit, wherein the activation determination unit determines whether or not the vehicle is parked using an index different from that for the activation instruction unit, wherein each of the first detection unit and the second detection unit acquires the state of the vehicle from a group of electronic control devices selected from the at least two or more groups of electronic control devices, and wherein the group of electronic control devices from which the first detection unit acquires the state of the vehicle is different from the group of electronic control devices from which the second detection unit acquires the state of the vehicle.

2. The electronic control system for vehicles according to claim 1, wherein the activation determination unit acquires the instruction to activate the program from the activation instruction unit and concurrently determines whether or not the vehicle is parked using the second detection unit.

3. The electronic control system for vehicles according to claim 1, wherein when the activation instruction unit determines whether or not the vehicle is parked, the first detection unit detects any one of a parking brake state, an ignition switch state, a vehicle speed, and a gear position, when the activation determination unit determines whether or not the vehicle is parked, the second detection unit detects any one of the parking brake state, the ignition switch state, the vehicle speed, and the gear position, and any one of the parking brake state, the ignition switch state, the vehicle speed, and the gear position detected by the first detection unit is different from any one of the parking brake state, the ignition switch state, the vehicle speed, and the gear position detected by the second detection unit.

4. The electronic control system for vehicles according to claim 1, wherein the second detection unit acquires a signal from a CAN bus.

5. The electronic control system for vehicles according to claim 1, wherein when the activation execution unit activates the program, the vehicle is controlled so as to maintain a parking state of the vehicle from start to completion of activation of the program.

6. The electronic control system for vehicles according to claim 1, wherein the storage unit is a nonvolatile memory having at least a first data storage side and a second data storage side.

7. The electronic control system for vehicles according to claim 6, wherein the rewrite execution unit writes the update data acquired from the master device to the second data storage side in a state in which the program stored in the first data storage side is operating.

8. The electronic control system for vehicles according to claim 7, wherein when activating the program stored in the second data storage side and rewritten with the update data, the activation execution unit operates the rewritten program stored in the second data storage side and stops operation of the program stored in the first data storage side.

9. The electronic control system for vehicles according to claim 1, wherein the activation execution unit activates the program rewritten with the update data while the program is operating.

10. The electronic control system for vehicles according to claim 1, wherein even when determining that the vehicle is parked using the second detection unit, the activation determination unit prevents activation of the program by the activation execution unit, provided that a predetermined activation prevention condition is satisfied.

11. An electronic control device comprising:
a storage unit including a data storage side;
a second detection unit that detects a state of a vehicle;
a rewrite execution unit that acquires update data from a master device and writes the update data to the data storage side to rewrite a program, the master device acquiring the update data from an external instrument;
an activation determination unit that determines whether or not to activate the program rewritten with the update data; and
an activation execution unit that activates the program,
the rewrite execution unit writing the update data to the data storage side according to an instruction from a rewrite instruction unit of the master device, the rewrite instruction unit instructing the rewrite execution unit to write the update data to the data storage side,
the activation execution unit activating the program according to an instruction from an activation instruction unit of the master unit, the activation instruction unit instructing the activation execution unit to activate the program when the master device determines that the vehicle is parked using a first detection unit after the rewrite execution unit writes the update data to the data storage side according to the instruction from the rewrite instruction unit, the first detection unit detecting the state of the vehicle, the first detection unit being different from the second detection unit,
the activation determination unit determining whether or not the vehicle is parked using the second detection unit when the activation execution unit activates the program according to the instruction from the activation instruction unit,
the activation execution unit activating the program when the activation determination unit determines that the vehicle is parked using the second detection unit,
wherein the master device is connected to at least two or more groups of electronic control devices each comprising the electronic control device,
wherein the activation determination unit determines whether or not the vehicle is parked using an index different from that for the activation instruction unit,
wherein each of the first detection unit and the second detection unit acquires the state of the vehicle from a group of electronic control devices selected from the at least two or more groups of electronic control devices, and
wherein the group of electronic control devices from which the first detection unit acquires the state of the vehicle is different from the group of electronic control devices from which the second detection unit acquires the state of the vehicle.

12. A master device that gives an instruction to an electronic control device having a storage unit including a data storage side, the master device comprising:
an update data acquisition unit that acquires update data from an external instrument;
a first detection unit that detects a state of a vehicle, the first detection unit being different from a second detection unit that is included in the electronic control device and detects the state of the vehicle;
a rewrite instruction unit that instructs a rewrite execution unit of the electronic control device to write the update data to the data storage side to rewrite a program, the rewrite execution unit writing the update data acquired from the master device to the data storage side to rewrite the program; and an activation instruction unit that instructs an activation execution unit of the electronic control device to activate the program when determining that the vehicle is parked using the first detection unit after the rewrite execution unit writes the update data to the data storage side according to the instruction from the rewrite instruction unit, the activation execution unit activating the program rewritten with the update data, the electronic control device including an activation determination unit that determines whether or not to activate the program, the activation determination unit determining whether or not the vehicle is parked using the second detection unit when the activation execution unit activates the program according to the instruction from the activation instruction unit, the activation execution unit activating the program when the activation determination unit determines that the vehicle is parked using the second detection unit, wherein the master device is connected to at least two or more groups of electronic control devices each comprising the electronic control device, wherein the activation instruction unit determines whether or not the vehicle is parked using an index different from that for the activation determination unit, wherein each of the first detection unit and the second detection unit acquires the state of the vehicle from a group of electronic control devices selected from the at least two or more groups of electronic control devices, and wherein the group of electronic control devices from which the first detection unit acquires the state of the vehicle is different from the group of electronic control devices from which the second detection unit acquires the state of the vehicle.

13. A method for updating a program for vehicles, the method comprising:

acquiring update data from an external instrument to a master device;

writing the update data acquired to the master device to a data storage side of a storage unit included in an electronic control device according to an instruction from the master device;

determining whether or not the vehicle is parked using a first detection unit after writing the update data to the data storage side;

when determining that the vehicle is parked using the first detection unit, giving an instruction to the electronic control device to activate a program stored in the data store side and rewritten with the update data;

when activating the program according to the instruction to activate the program, determining whether or not the vehicle is in a parking state using a second detection unit different from the first detection unit; and when determining that the vehicle is in the parking state using the second detection unit, activating the program, wherein different indices are used in determination of parking in the first detection unit and determination of parking in the second detection unit to determine whether or not the vehicle is parked, wherein the master device is connected to at least two or more groups of electronic control devices each comprising the electronic control device, wherein each of the first detection unit and the second detection unit acquires the state of the vehicle from a group of electronic control devices selected from the at least two or more groups of electronic control devices, and wherein the group of electronic control devices from which the first detection unit acquires the state of the vehicle is different from the group of electronic control devices from which the second detection unit acquires the state of the vehicle.

* * * * *